US012560063B2

(12) United States Patent
Mayor et al.

(10) Patent No.: US 12,560,063 B2

(45) Date of Patent: Feb. 24, 2026

(54) METHOD OF ENHANCING FOAM STABILITY FOR STIMULATION OF LOW PRESSURE RESERVOIRS

(71) Applicant: Baker Hughes Oilfield Operations LLC, Houston, TX (US)

(72) Inventors: John H. Mayor, Cypress, TX (US); Marty J. Usie, Youngsville, LA (US); Kelly Guilbeau Berard, Breaux Bridge, LA (US)

( * ) Notice: Subject to any disclaimer, the term of this patent is extended or adjusted under 35 U.S.C. 154(b) by 86 days.

(21) Appl. No.: 17/978,538

(22) Filed: Nov. 1, 2022

(65) Prior Publication Data

US 2024/0159131 A1 May 16, 2024

(51) Int. Cl.

| | |
|---|---|
| ***E21B 43/25*** | (2006.01) |
| ***C09K 8/60*** | (2006.01) |
| ***C09K 8/68*** | (2006.01) |
| ***C09K 8/70*** | (2006.01) |

(52) U.S. Cl.

CPC .............. *E21B 43/25* (2013.01); *C09K 8/602* (2013.01); *C09K 8/68* (2013.01); *C09K 8/703* (2013.01); *C09K 2208/30* (2013.01)

(58) Field of Classification Search

CPC .......... C09K 8/58; C09K 8/584; C09K 8/588; C09K 8/602; C09K 8/604; C09K 8/62; C09K 8/68; C09K 8/70; C09K 8/703; C09K 2208/06; C09K 2208/30; E21B 43/25; E21B 43/255; E21B 43/26; E21B 43/2605

See application file for complete search history.

(56) References Cited

U.S. PATENT DOCUMENTS

| | | | | |
|---|---|---|---|---|
| 1,000,693 | A | 8/1911 | Sawyer | |
| 7,188,676 | B2 | 3/2007 | Qu et al. | |
| 7,358,215 | B1 * | 4/2008 | Subramanian | C09K 8/68 166/308.2 |
| 7,392,844 | B2 | 7/2008 | Berry et al. | |
| 7,481,273 | B2 | 1/2009 | Javora et al. | |
| 8,985,206 | B2 | 3/2015 | Morvan et al. | |
| 9,464,223 | B2 | 10/2016 | Champagne et al. | |
| 9,505,970 | B2 | 11/2016 | Vaughn et al. | |
| 9,850,418 | B2 | 12/2017 | Champagne et al. | |
| 9,868,893 | B2 | 1/2018 | Saboowala et al. | |
| 10,717,919 | B2 | 7/2020 | Germack et al. | |
| 11,034,879 | B2 | 6/2021 | Champagne et al. | |
| 11,254,856 | B2 | 2/2022 | Hill et al. | |

(Continued)

FOREIGN PATENT DOCUMENTS

| | | | | |
|---|---|---|---|---|
| AU | 2015227467 | A1 | 4/2017 | |
| BR | 112021006125 | A2 * | 7/2021 | C09K 8/584 |

(Continued)

OTHER PUBLICATIONS

Translation of BR-112021006125-A2 (Year: 2021).*

(Continued)

*Primary Examiner* — Angela M Ditrani Leff

(74) *Attorney, Agent, or Firm* — Baker Hughes Company

(57) ABSTRACT

The stability of foams containing a viscoelastic surfactant of an amine or amidoamine oxide and exhibiting thermal resistance at bottomhole temperatures greater than 300° F. may be enhanced by including in the foam a microemulsion containing a nonionic surfactant and a terpene.

20 Claims, 2 Drawing Sheets

(56) References Cited

U.S. PATENT DOCUMENTS

| | | | | |
|---|---|---|---|---|
| 2003/0166472 | A1* | 9/2003 | Pursley | C09K 8/82 507/200 |
| 2006/0264335 | A1 | 11/2006 | Penna et al. | |
| 2007/0125542 | A1* | 6/2007 | Wei | C09K 8/602 507/252 |
| 2007/0187105 | A1 | 8/2007 | Chatterji et al. | |
| 2020/0332177 | A1* | 10/2020 | Hill | C09K 8/92 |
| 2021/0348048 | A1* | 11/2021 | Misra | E21B 37/06 |

FOREIGN PATENT DOCUMENTS

| | | | | |
|---|---|---|---|---|
| CA | 3038464 | C | 5/2022 | |
| EP | 1997863 | A1 * | 12/2008 | C09K 8/524 |
| EP | 3067404 | A1 * | 9/2016 | B01D 17/047 |
| EP | 3144366 | A1 | 3/2017 | |
| EP | 3067404 | B1 * | 3/2019 | B01D 17/047 |

OTHER PUBLICATIONS

Graham Chemical, Cocoamidopropylamine oxide, retrieved Jul. 30, 2025 from https://www.grahamchemical.com/products/cocamidopropylamine-oxide-performer-amine-oxide-g700/ (Year: 2025).*

Microsolv (TM) 130, Flotek, 2 pp., Mar. 2022.

MicroSolv (TM) 130, Stimulation Additive, Flotek, 1 pg., Feb. 2022.

PCT/US2023/034643, International Search Report and Written Opinion of the International Search Authority, Feb. 2, 2024.

* cited by examiner

METHOD OF ENHANCING FOAM STABILITY FOR STIMULATION OF LOW PRESSURE RESERVOIRS

FIELD OF THE DISCLOSURE

The disclosure relates to a method for treating a subterranean formation by introducing into a well penetrating the formation a fluid comprising a foaming agent, a viscoelastic surfactant of an amine or amidoamine oxide and a microemulsion containing a nonionic surfactant and a terpene. When pumped downhole, the fluid forms a highly stable foam having particular applicability for use in high temperature and low pressure reservoirs.

BACKGROUND OF THE DISCLOSURE

When treating a subterranean formation which is sensitive to water, it is often necessary to minimize the amount of water in the treatment fluid. In such instances, it is often preferred to mix a gas with the treatment fluid. The resulting foam fluid often reduces the amount of water in the treatment fluid without loss of volume. The foam fluid is often used in stimulation operations in the recovery of hydrocarbon fluids. In addition to increasing viscosity of the treatment fluid, the foaming agent further contributes to the stability of the fluid. Since they contain less liquid, such foam treatment fluids are further inherently cleaner than non-foamed fluids.

Foam fluids are often used in the treatment of low pressure reservoirs and depleted reservoirs as well as underpressured reservoirs. Such fluids reduce flow resistance of produced fluids and thus provide improved flowback of hydrocarbons.

In certain applications, such as in stimulation operations, foamed fluids contain a viscosifying agent. Historically, such foam fluids were created from the interaction of water-soluble polymers such as cellulosic and guar derivatives with an organometallic or borate releasing crosslinking agent and a foaming gas. In some cases, an organic foaming agent was also used to create the foam fluid. Such organic foaming agents were often based on betaines, alpha olefin sulfonates, sulfate ethers, ethoxylated sulfate ethers and ethoxylates. The foam became viscous once the polymer hydrated and reacted with the crosslinking agent. While such systems readily formed three-dimensional gels, crosslinking agents were found to be ineffective in the presence of gaseous foaming agents. The ultimate effect was a substantial loss of foam viscosity.

Alternative foaming fluids have been developed using non-polymeric viscoelastic surfactants. Such foams generated different levels of yield stress depending on the type and concentration of surfactants as well as foam quality. Further, such foams were shown to be effective in diverting the treatment fluid into less permeable areas of the formation by blocking more permeable zones. As such, when used as a diverting fluid, foam treatment fluids have been shown to be effective in acidizing as well as acid stimulation of the formation. The diverting agent gelled upon spending of the acid. Thus, when subsequent fluid was injected into the formation, the gelled viscoelastic fluid caused the subsequent injected fluid to be directed away from the formation with the highest permeability and highest degree of water saturation to the lower permeability. In water or gas injector fluids, such fluids were also found to further to increase the sweep.

However, foam fluids of non-polymeric viscoelastic surfactants were seen to exhibit poor stability in low pressure as well as high temperature wells. In light of the instability of the fluid, the effectiveness of the fluid as diverter fluids has been shown to be ineffective in high temperature and low pressure wells. In addition, they have been shown to cause residual formation damage in such wells. Alternatives have therefore been sought.

It should be understood that the above-described discussion is provided for illustrative purposes only and is not intended to limit the scope or subject matter of the appended claims. Thus, none of the appended claims should be limited by the above discussion or construed to address, include or exclude each or any of the above-cited features or disadvantages merely because of the mention thereof herein.

SUMMARY OF THE DISCLOSURE

In an embodiment, the stability of a foam fluid containing a non-polymeric viscoelastic surfactant is improved by the addition of a microemulsion to the fluid. The microemulsion enhances the stability of the foam when the fluid is introduced into a high temperature and/or low pressure well. The microemulsion contains a terpene and a nonionic, amphoteric or cationic non-polymeric surfactant of formula (I):

(I)

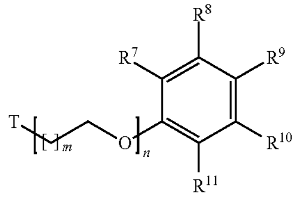

wherein (i) each of $R^7$, $R^8$, $R^9$, $R^{10}$, and $R^{11}$ is the same or different and selected from the group consisting of hydrogen, a $C_1$-$C_6$ alkyl (optionally substituted), and —CH═CHAr, wherein Ar is an aryl group including phenyl, provided at least one of $R^7$, $R^8$, $R^9$, $R^{10}$, and $R^{11}$ is —CH═CHAr; and (ii) T is either hydrogen, $C_{1-6}$ alkyl, $X^+Y^-$ or $Z^+$; n is an integer from about 1 to about 100, each m is independently 1 or 2, $X^+$ is a metal cation or $N(R^{13})_4$, wherein each $R^{13}$ is independently selected from the group consisting of hydrogen, optionally substituted alkyl, or optionally substituted aryl; Y is an anionic group. In some embodiments, $X^+$ is $NH_4$. Non-limiting examples of metal cations are $Na^+$, $K^+$, $Mg^{+2}$, and $Ca^{+2}$. In some embodiments, for a compound of Formula (II), $Y^-$ is —O, —SO2O$^-$, or —$OSO_2O^-$. $Z^+$ is a group as defined above for X. The non-polymeric viscoelastic surfactant is of formula (II):

(II)

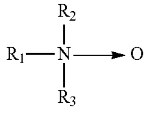

wherein (i) $R_1$ is an alkyl, alkenyl, cycloalkyl, alkylarylalkyl, alkylamido or alkylamidoalkyl and has from about 8 to about 30 carbon atoms; and (ii) $R_2$ and $R_3$ are independently hydrogen or an aliphatic group having from 1 to about 30 carbon atoms. The mixture of non-polymeric viscoelastic surfactant and microemulsion is also combined with a foaming gas.

In another embodiment, a low pressure and/or high temperature reservoir is subjected to a treatment process by pumping into the reservoir a foaming gas, a non-polymeric viscoelastic surfactant of formula (II) and microemulsion containing a terpene and a surfactant of formula (I). The treatment process to which the foam fluid is introduced may be a stimulation operation, such as matrix acidizing, acid fracturing, hydraulic fracturing, etc. The treatment process may also be used to prevent hydrocarbon flowback such as by consolidating loose or poorly consolidated particulates in the reservoir or formation. In addition, the treatment process may be used in remediation, such as in the removal of undesired deposits as well as restoring productivity of the reservoir.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
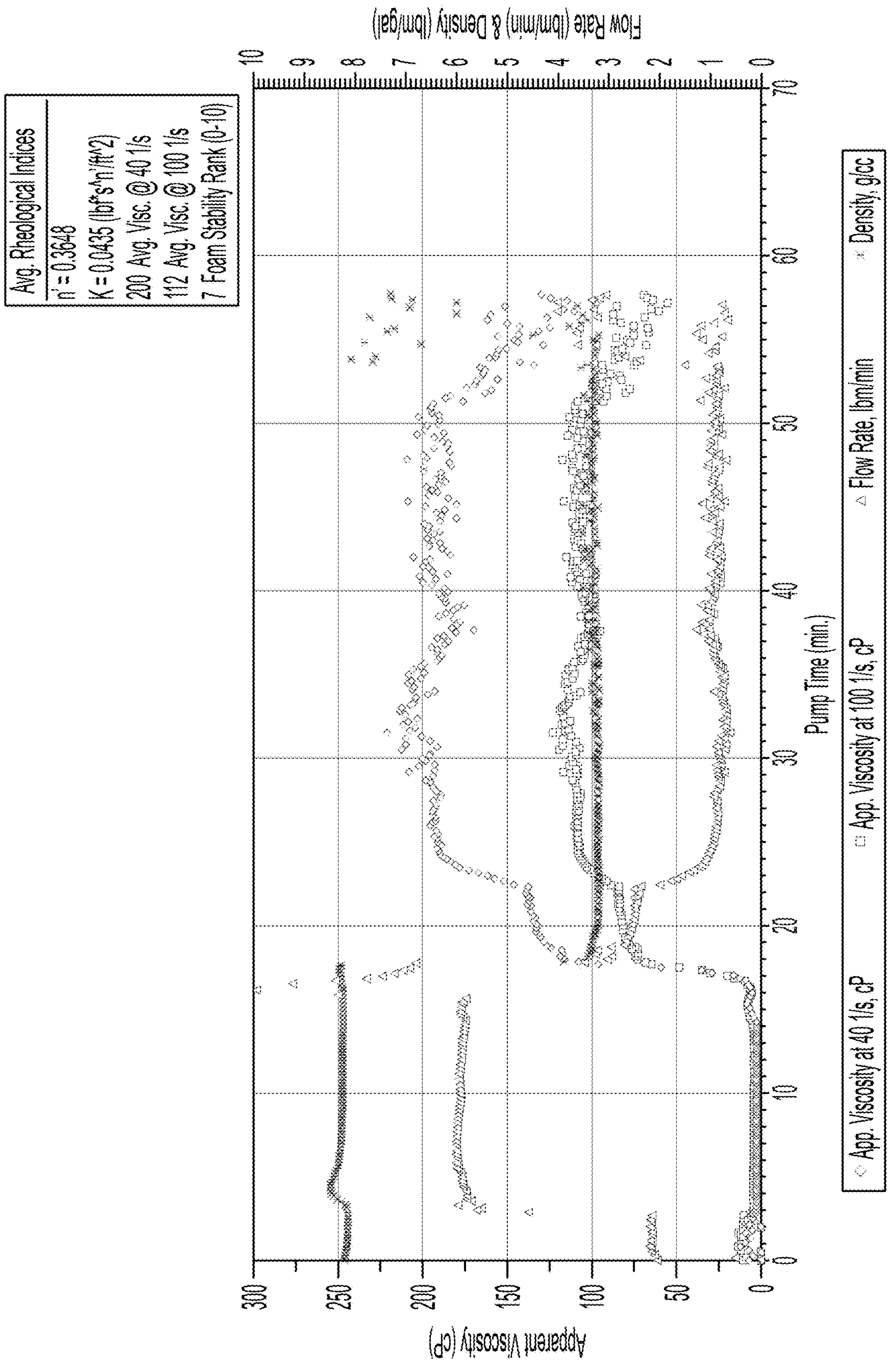
FIG. 1 illustrates the stability of a foam comprising a non-polymeric viscoelastic surfactant and microemulsion containing a terpene solvent and a nonionic surfactant as described herein.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of exemplary embodiments, is not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ."

Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, reaction products, and the like.

All references are incorporated herein by reference.

The foaming fluid disclosed herein contain (i) a non-polymeric viscoelastic surfactant; (ii) microemulsion containing a terpene; and (iii) a foaming gas. The microemulsion further contains an ionic, amphoteric or cationic surfactant.

In addition, the fluid may contain one or more conventional additives such as scale inhibitors, fluid loss control additives, corrosion inhibitors, scale inhibitors, clay control agents, hydrogen sulfide scavengers, filter cake removal agents, etc.

The foaming fluid is prepared by the mixing the microemulsion with the non-polymeric viscoelastic surfactant. The viscoelastic surfactant is typically mixed with the microemulsion in a carrier fluid. Suitable carrier fluids include aqueous fluids like distilled water, fresh water, salt water, liquid hydrocarbon or a high density brine. Brines are often preferred and the typical density of the brine may be between from about 8.4 ppg (pounds per gallon) to about 20 ppg. Depending on the desired density of the aqueous fluid, a brine can be a one salt solution (e.g. NaCl, NaBr, KCl, $CaCl_2$), $CaBr_2$, $ZnBr_2$ or formate salt in water), a two salt solution (e.g. $CaCl_2/CaBr_2$ or $ZnBr_2/CaBr_2$), or a three salt solution (e.g. $ZnBr_2/CaBr_2/CaCl_2$)). The density and pH of the foaming fluid may be determined by the composition of the brine.

The foaming gas is introduced to the fluid prior to pumping the fluid downhole. Alternatively, the foaming gas may be introduced into the well simultaneously with the pumping of the fluid, the foam being created as the foaming gas is atomized.

The non-polymeric viscoelastic surfactant forms long rod-like or worm-like micelles when exposed to water. Entanglement of these micelle structures downhole provides viscosity and elasticity to the fluid.

The microemulsion enhances gelation of the viscoelastic surfactant and provides greater elasticity to the micellular structure formed in-situ. It further assists in dispersion of the viscoelastic surfactant in the carrier fluid. Further, the microemulsion in the foamed well treatment fluid enhances thermal stability of the fluid. In other words, thermal stability, as evidenced by foam stability, of the treatment fluid containing both the non-polymeric viscoelastic surfactant and microemulsion is greater than the thermal stability (foam stability) of the treatment fluid containing only the non-polymeric viscoelastic surfactant or microemulsion. For instance, foam containing only the viscoelastic surfactant and microemulsion has been noted not to degrade until about 350° F. compared to the foam containing only viscoelastic surfactant which degrades around 300° F.

In addition, the presence of the microemulsion in the foaming fluid provides a significant improvement in maintaining the foam quality of the fluid while the fluid is pumped into a low pressure or high temperature well.

The presence of the microemulsion in the foaming fluid has been shown to provide a more robust film surface to the gelled fluid. This enhances the elasticity of the foam bubbles and contributes to the stability of the foam. Further, the presence of the microemulsion in the foaming fluid described herein induces a yield stress change, in addition to a viscosity change compared to a foamed treatment fluid containing only the viscoelastic surfactant. The enhancement to foam stability of the fluid containing microemulsion and viscoelastic surfactant enables more effective clean-up of the formation while improving flowback of stimulation fluids as well as coverage of stimulation fluids over multiple zones having varying permeabilities.

The foaming gas introduced to the fluid containing the viscoelastic surfactant and microemulsion includes nitrogen, carbon dioxide as well as inert gases like argon as well as mixtures thereof.

The foam fluid referenced herein may be an energized foam if the volume percent of energizing medium to total volume of the treatment fluid (defined as "quality") is less than 53% or a foamed fluid if the volume percent is greater than 53%. (Foam quality is indicative of the percentile amount of bubbles dispersed in the foam, below which they no longer touch one another and are separated from one another by lamellae in the continuous phase.) Typically, the foam quality of the foamed well treatment fluid described herein is from about 52 to about 80 percent and sometimes greater than 90 percent to about 96 volume percent. As used herein, a "foamed well treatment fluid" shall refer to a fluid which is either an energized fluid or foam fluid.)

While the foamed well treatment composition may be used to treat any type of well that requires annular treatment, in a preferred embodiment the foamed well treatment fluid is used to treat low pressure wells. Such wells include those which produce water associated with gas as well as those which utilize a gas phase to enhance diversion and assist flowback. (As used herein, a low pressure well shall include any of the following: (1) a well having a shut-in wellhead pressure of less than 2,000 pounds per square inch absolute ($1.38\times10^7$ pascals); (2) a well having reservoir pressure and vertical well depth such that 0.445 times the reservoir pressure (in psia) minus 0.038 times the vertical well depth (in feet) minus 67.578 psia is less than the flow line pressure at the sales meter; (3) a well wherein the static pressure at the wellhead following fracturing but prior to the onset of flowback is less than the flow line pressure at the sales meter; or (4) a well wherein the pressure of flowback fluid immediately before it enters the flow line, as determined under 37 CFR 60.5432a, is less than the flow line pressure at the sales meter; or (3) flowback of the fracture fluids will not occur without the use of artificial lift equipment.)

The viscoelastic surfactant referenced herein is a high temperature surfactant in that it degrades at a bottomhole temperature in excess of 300° F. It provides viscoelasticity by forming elongated, often cylindrical, micelles which may be described as worm-like, thread-like, or rod-like micelles. Such elongated micelles exhibit rheological properties at temperatures in excess of 300° F. While they may exhibit shear-thinning behavior, they remain stable when subjected to high shear.

The microemulsion when mixed with the viscoelastic surfactant enhances the thermal stability of the surfactant such that the viscoelastic surfactant does not thermally degrade until the temperature in the formation reaches greater than or equal to 325° F., in some cases greater than or equal to 350° F. and in other cases greater than or equal to 375° F. and in some cases as high as 450° F. and in other cases as high as 500° F. or higher. Complete degradation of the gelled fluid containing the viscoelastic fluid occurs as the bottomhole temperature in the well increases, formation fluids are diluted and the micellular structure of the viscoelastic surfactant is inverted.

The viscoelastic surfactant can be selected from amine oxide surfactants including amidoamine oxide surfactants and may be a mixture of two or more thereof. Suitable viscoelastic surfactants include an amine or amidoamine oxide of structural formula (II):

(II)

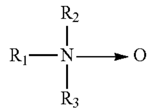

where:

- $R_1$ is an alkyl, alkenyl, cycloalkyl, alkylarylalkyl, alkylamido or alkylamidoalkyl and has from about 8 to about 30 carbon atoms and may be straight or branched chained and saturated or unsaturated. Examples of long chain alkyl groups include, but not limited to, octadecenyl (oleyl), octadecyl (stearyl), docosenoic (erucyl) and the derivatives of tallow, coco, soy and rapeseed oils;
- $R_2$ and $R_3$ are, independently, hydrogen or an aliphatic group having from 1 to about 30 carbon atoms, preferably from about 1 to about 20 carbon atoms, more preferably from about 1 to about 10 carbon atoms, and most preferably from about 1 to about 6 carbon atoms. Representative aliphatic groups include alkyl, alkenyl, cycloalkyl, alkylaryl, hydroxyalkyl, carboxyalkyl and hydroxyalkyl-polyoxyalkylene. The aliphatic group may be straight or branched chained and saturated or unsaturated.

In an embodiment, the viscoelastic surfactant may be an amidoamine oxide, such as of the structural formula (III):

(III)

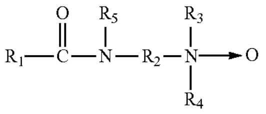

or an alkylamido quaternary amine, such as of the structural formula (IV):

(IV)

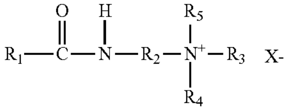

where:

$R_1$ is a straight or branched chained and saturated or unsaturated aliphatic group of from about 8 to about 30 carbon atoms, preferably from about 14 to about 22 carbon atoms. More preferably, $R_1$ is a fatty aliphatic derived from natural fats and oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl;

$R_2$ is a straight or branched-chained, substituted or unsubstituted, divalent alkylene group of from 2 to about 6 carbon atoms, preferably, of 2 to 4 carbon atoms and more preferably of 3 carbon atoms;

$R_3$ and $R_4$ are the same or different, straight or branched-chain, substituted or unsubstituted, saturated or unsaturated and are selected from alkyl or hydroxyalkyl groups of from 1 to about 6 carbon atoms that may optionally be alkoxylated and are preferably hydroxyethyl or methyl. Alternatively, $R_3$ and $R_4$ together with the nitrogen atom to which these groups are bonded form a heterocyclic ring of up to 6 members;

$R_5$ is hydrogen, $R_3$ or $R_4$, preferably a $C_1$-$C_4$ alkyl or hydroxyalkyl group; and X is an acceptable counterion including halides, oxo ions of phosphorus, sulfur or chloride, organic anions including chlorides, bromides, iodides, oxides of phosphorous, hypochlorides, phosphates, phosphates, oxides of sulfur, sulfates, sulfites, sulfonates, phosphates, acetates, carboxylates, chlorates, perchlorates, salicylates, phthalates, lactates, maleates, glycinates, citrates, citric acid, lactic acid, salicylic acid, phthalic acid, benzoic acid, naphthoic acid, amino acids, and the like.

Examples of amidoamine oxide viscoelastic surfactants include, but are not limited to, tallow amidoalkylamine oxides including tallowalkylamidopropyldimethylamine oxide, hardened tallow amidoalkylamine oxides, rapeseed amidoalkylamine oxide, hardened rapeseed amidoalkylamine oxide, tall oil amidoalkylamine oxide, hardened amidoalkylamine oxide, coco amidoalkylamine oxide, stearyl amidoalkylamine oxide, oleyl amidoalkylamine oxide, soya amidoalkylamine oxide, and mixtures thereof.

Preferred amidoamine oxides include a tallow amidopropylamine oxide, tallow amidopropyl dimethylamine oxide, hydrogenated tallow amidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$-$C_{22}$ saturated or unsaturated fatty acid amidopropyl dimethylamine oxides, and mixtures thereof.

In an embodiment, the viscoelastic surfactant is of the formula (IV) where $R_1$ is preferably derived from a fatty aliphatic derived from natural fats or oils having an iodine value of from about 1 to about 140, preferably from about 30 to about 90, and more preferably from 40 to about 70; $R_1$ may be restricted to a single chain length or may be of mixed chain length such as those groups derived from natural fats and oils or petroleum stocks. Preferred are tallowalkyl, hardened tallow alkyl, rapeseed alkyl, hardened rapeseed alkyl, erucic alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$, $R_4$ and $R_5$ are the same or different and are selected from alkyl, aryl or hydroxyalkyl groups of from 1 to about 8 carbon atoms and are preferably hydroxyethyl or methyl. Alternatively, $R_3$, $R_4$ and $R_5$ together with the nitrogen atom to which these groups are bonded form a heterocyclic ring of up to 6. $R_5$ is hydrogen or a $C_1$-$C_4$ alkyl or hydroxyalkyl group. Specific examples of alkyl amido quaternary amines include erucyl amidopropyl trimethyl ammonium chloride, isostearylamidopropylmorpholine, dimethylalkylglycerolammonium chloride, etc.

Other viscoelastic surfactants are those of the formula (V):

(V)

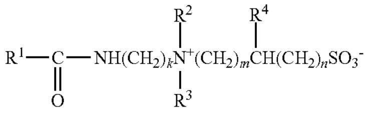

wherein:

$R^1$ is a saturated or unsaturated, hydrocarbon group of from about 17 to about 29 carbon atoms;

$R^2$ and $R^3$ are independently selected from a straight chain or branched, alkyl or hydroxyalkyl group of from 1 to about 6 carbon atoms;

$R^4$ is selected from —H, —OH, alkyl and hydroxyalkyl groups of from 1 to about 4 carbon atoms;

k is an integer of from about 2 to about 20;

m is an integer from about 1 to about 20; and n is an integer of from 0 to about 20.

In an embodiment $R^1$ of (V) is from about 18 to about 21 carbon atoms. In another embodiment, $R^1$ is a fatty aliphatic derived from natural fats or oils having an iodine value of from about 1 to about 140, typically from about 30 to about 90, and more typically from 40 to about 70. $R^1$ may be restricted to a single chain length or may be of mixed chain length such as those groups derived from natural fats and oils or petroleum stocks. Examples are tallow alkyl, hardened tallow alkyl, rapeseed alkyl, hardened rapeseed alkyl, tall oil alkyl, hardened tall oil alkyl, coco alkyl, oleyl, erucyl or soya alkyl.

In an embodiment, the number of carbons in $R^2$ and $R^3$ may be from about 1 to about 4 and still another embodiment the number of carbons in $R^2$ and $R^3$ may be from about 1 to about 3 carbon atoms.

In embodiment, $R^4$ may be selected independently from ethyl, —OH, hydroxyethyl and methyl.

In another embodiment, k is preferably an integer of from about 2 to about 12, and in other instances is an integer from about 2 to about 6, and in yet another embodiment, k is an integer from about 2 to about 4.

In another embodiment, m is an integer from about 1 to about 12, and in another embodiment from about 1 to about 6 and in another embodiment from about 1 to about 3.

In another embodiment, n is an integer from 0 to about 12, and in another embodiment from 0 to about 6, and in still another embodiment 0 or 1.

Exemplary of such viscoelastic surfactants are erucamidopropyl hydroxypropyl sulfobetaine (also known as erucamido hydroxysultaine), erucamidopropyl hydroxyethyl sulfobetaine, erucamidopropyl hydroxymethyl sulfobetaine and mixtures thereof.

Foam stability and thermal stability of the foam containing the viscoelastic fluid is enhanced by the addition of the terpene containing microemulsion to the viscoelastic fluid. The microemulsion enhances the stability of the foam especially when the viscoelastic surfactant is used in high temperature and/or low pressure wells. The enhanced stability permits use of lower concentrations of viscoelastic surfactant concentrations in the fluid.

The amount of microemulsion in the foamed treatment fluid is between from about 0.05 to about 0.4, preferably from about 0.075 to about 0.2, more preferably from about 0.1 to about 0.2, weight percent.

It is believed the microemulsion provides greater elasticity to the bubbles in the foam as well as to the micellular structure of the viscoelastic surfactant which enables the viscoelastic surfactant to be more efficiently dispersed in the brine or carrier fluid. Further, the presence of the microemulsion enhances the self-diverting properties of fluid containing the viscoelastic surfactant.

The microemulsion comprises an aqueous phase. Generally, the aqueous phase comprises water. The water may be provided from any suitable source (e.g., sea water, fresh water, deionized water, reverse osmosis water, water from field production). In an embodiment, the total amount of water present in the microemulsion is between about 1 wt % about 95 wt %, or between about 1 wt % about 90 wt %, or between about 1 wt % and about 60 wt %, or between about 5 wt % and about 60 wt % or between about 10 and about 55 wt %, or between about 15 and about 45 wt %, versus the total microemulsion composition.

The microemulsions described herein are stabilized microemulsions that are formed by the combination of the blend of terpene-containing solvent and a surfactant. The diameter of the particulates or droplets of the microemulsion is typically in the range of about between about 1 and about 1000 nm, or between 10 and about 1000 nanometers, or between about 10 and about 500 nm, or between about 10 and about 300 nm, or between about 10 and about 100 nm.

The surfactant is of the structure of Formula (I):

(I)

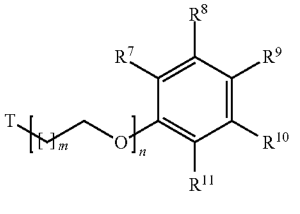

wherein each of $R^7$, $R^8$, $R^9$, $R^{10}$, and $R^{11}$ are the same or different and are selected from the group consisting of hydrogen, optionally substituted $C_1$-$C_6$ alkyl, and —CH═CHAr, wherein Ar is an aryl group including phenyl, provided at least one of $R^7$, $R^8$, $R^9$, $R^{10}$, and $R^{11}$ is —CH═CHAr, T is either hydrogen, $C_{1-6}$ alkyl, $X^+Y^-$ or $Z^+$, n is 1-100, each m is independently 1 or 2, $X^+$ is a metal cation or $N(R^{13})_4$, wherein each $R^{13}$ is independently selected from the group consisting of hydrogen, optionally substituted alkyl, or optionally substituted aryl; Y is an anionic group. In some embodiments, $X^+$ is $NH_4$. Non-limiting examples of metal cations are $Na^+$, $K^+$, $Mg^{+2}$, and $Ca^{+2}$. In some embodiments, for a compound of Formula (II), $Y^-$ is —O, —$SO_2O^-$, or —$OSO_2O^-$; and $Z^+$ is $N(R^{13})_3$ wherein each $R^{13}$ is independently selected from hydrogen, alkyl (optionally substituted) or optionally substituted aryl.

In a preferred embodiment, the surfactant is a nonionic surfactant of formula (I) wherein T is either hydrogen or a $C_{1-6}$ alkyl.

In some embodiments, Ar is phenyl. In some embodiments, for a compound of Formula (I), T is hydrogen or $C_{1-6}$ alkyl. In some embodiments, for a compound of Formula (I), T is H, methyl, or ethyl.

In some embodiments, two of $R^7$, $R^8$, $R^9$, $R^{10}$, and $R^{11}$ are —CH═CHAr. In some embodiments, one of $R^7$, $R^8$, $R^9$, $R^{10}$, and $R^{11}$ is —CH═CHAr and each of the other groups is hydrogen. In some embodiments, two of $R^7$, $R^8$, $R^9$, $R^{10}$, and $R^{11}$ are —CH═CHAr and each of the other groups is hydrogen. In some embodiments, $R^7$ and $R^8$ are —CH═CHAr and $R^9$, $R^{10}$, and $R^{11}$ are each hydrogen. In some embodiments, three of $R^7$, $R^8$, $R^9$, $R^{10}$, and $R^{11}$ are —CH═CHAr and each of the other groups is hydrogen. In some embodiments, $R^7$, $R^8$, and $R^9$ are —CH═CHAr and $R^{10}$ and $R^{11}$ are each hydrogen. In embodiments, Ar is phenyl. In some embodiments, each m is 1. In some embodiments, each m is 2. In some embodiments, n is 6-100, or 1-50, or 6-50, or 6-25, or 1-25, or 5-50, or 5-25, or 5-20.

The amount of surfactant of formula (I) in the microemulsion may be between about 1 wt % and about 20 wt %, or between about 3 wt % and about 15 wt %, or between about 5 wt % and about 13 wt %, or between about 5 wt % and about 11 wt %, or between about 7 wt % and about 11 wt %, or between about 10 wt % and about 12 wt %, or between about 8 wt % and about 12 wt %, or between about 8 wt % and about 10 wt %, or about 9 wt %.

The microemulsion further contains a terpene or a terpenoid. In some embodiments, the sole solvent of the microemulsion is a terpene or terpenoid. Suitable terpenes include monoterpenes (e.g., having two isoprene units), sesquiterpenes (e.g., having 3 isoprene units), diterpenes, or the like. The term terpenoid also includes natural degradation products, such as ionones, and natural and synthetic derivatives, e.g., terpene alcohols, aldehydes, ketones, acids, esters, epoxides, and hydrogenation products. In some cases, the terpene is a naturally occurring terpene. In some cases, the terpene is a non-naturally occurring terpene and/or a chemically modified terpene (e.g., saturated terpene, terpene amine, fluorinated terpene, or silylated terpene).

In some embodiments, the terpene is a monoterpene. Monoterpenes may be further classified as acyclic, monocyclic, and bicyclic (e.g., with a total number of carbons in the range between 18-20), as well as whether the monoterpene comprises one or more oxygen atoms (e.g., alcohol groups, ester groups, carbonyl groups, etc.). In some embodiments, the terpene is an oxygenated terpene, for example, a terpene comprising an alcohol, an aldehyde, and/or a ketone group. In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, .beta.-occimene, γ-terpinene, α-pinene, and citronellene. In a particular embodiment, the terpene is selected from the group consisting of α-terpeneol, α-pinene, nopol, and eucalyptol. In one embodiment, the terpene is nopol. In another embodiment, the terpene is eucalyptol. In a preferred embodiment, the terpene is limonene (e.g., d-limonene).

In some embodiments, the terpene is a non-naturally occurring terpene and/or a chemically modified terpene (e.g., saturated terpene). In some cases, the terpene is a partially or fully saturated terpene (e.g., p-menthane, pinane). In some cases, the terpene is a non-naturally occurring terpene. Non-limiting examples of non-naturally occurring terpenes include, menthene, p-cymene, r-carvone, terpinenes (e.g., alpha-terpinenes, beta-terpinenes, gamma-terpinenes), dipentenes, terpinolenes, borneol, alpha-terpinamine, and pine oils.

The microemulsion may contain one or more solvents in addition to the terpene or terpenoid. Such solvents may include hydrocarbons such as an unsubstituted cyclic or acyclic, branched or unbranched alkanes or alkenes having from about 6 to about 12 carbons; branched or unbranched dialkylether compounds of the formula $C_nH_{2n+1}OC_mH_{2m+1}$ wherein n+m is between from about 6 to about 16, an aromatic hydrocarbon having a boiling point between from about 300 to about 400° F.

The solvent may also be an amine or amide. In some embodiments, the amine is of the formula $NR^1R^2R^3$, wherein $R^1$, $R^2$ and $R^3$ are the same or different and are hydrogen or cyclic or acyclic, branched or unbranched alkyl (e.g., $C_{1-16}$ alkyl, such as methyl or ethyl), optionally substituted, or optionally, any two of $R^1$, $R^2$ and $R^3$ are joined together to form a ring. In some embodiments, each of $R^1$, $R^2$ and $R^3$ are the same or different and are hydrogen or cyclic or acyclic, branched or unbranched alkyl, or optionally, any two of $R^1$, $R^2$ and $R^3$ are joined together to form a ring, provided at least one of $R^1$, $R^2$ and $R^3$ is methyl or ethyl.

Suitable amides include those of the formula $N(C{=}OR^4)R^5R^6$, wherein $R^4$, $R^5$, and $R^6$ are the same or different and are hydrogen or cyclic or acyclic, branched or unbranched alkyl (e.g., C.sub.1-16 alkyl), optionally substituted, or optionally, $R^5$ and $R^6$ are joined together to form a ring.

The water to solvent ratio in the microemulsion may be varied. In some embodiments, the ratio of water to solvent by weight is between about 15:1 and 1:10, or between 9:1 and 1:4, or between 3.2:1 and 1:4.

The amount of solvent(s) in the microemulsion is typically between about 1 wt % and about 99 wt %, or between about 2 wt % and about 90 wt %, or between about 1 wt % and about 60 wt %, or between about 2 wt % and about 60 wt %, or between about 1 and about 50 wt %, or between about 1 and about 30 wt %, or between about 5 wt % and about 40 wt %, or between about 5 wt % and about 30 wt %, or between about 2 wt % and about 25 wt %, or between about 5 wt % and about 25 wt %, or between about 60 wt % and about 95 wt %, or between about 70 wt % or about 95 wt %, or between about 75 wt % and about 90 wt %, or between about 80 wt % and about 95 wt %, versus the total microemulsion composition.

Typically, the microemulsion also contains an alcohol. In a preferred embodiment, the microemulsion contains a terpene, alcohol and a nonionic surfactant of formula (I) wherein T is hydrogen or a $C_{1-6}$ alkyl.

The alcohol may serve as a coupling agent between the solvent and the surfactant and aid in the stabilization of the microemulsion. The alcohol may also lower the freezing point of the microemulsion. The microemulsion may comprise a single alcohol or a combination of two or more alcohols. In some embodiments, the alcohol is selected from primary, secondary and tertiary alcohols having between 1 and 20 carbon atoms. In some embodiments, the alcohol comprises a first type of alcohol and a second type of alcohol. Non-limiting examples of alcohols include methanol, ethanol, isopropanol, n-propanol, n-butanol, i-butanol, sec-butanol, iso-butanol, and t-butanol. In some embodiments, the alcohol is ethanol or isopropanol. In some embodiments, the alcohol is isopropanol.

The alcohol may be present in the emulsion in any suitable amount. In some embodiments, the alcohol is present in an amount between about 0 wt % and about 50 wt %, or between about 0.1 wt % and about 50 wt %, or between about 1 wt % and about 50 wt %, or between about 2 wt % and about 50 wt % or between about 5 wt % and about 40 wt %, or between about 5 wt % and 35 wt %, versus the total microemulsion composition.

In an embodiment, the microemulsion comprises between from about 1 wt % to 95 wt % water, between from about 1 wt % and 99 wt % solvent, between about 0 wt % to about 50 wt % alcohol, between about 1 wt % and 90 wt % nonionic surfactant. In some embodiments, the microemulsion comprises between about 1 wt % and 60 wt % water, between about 1 wt % and 30 wt % terpene, between about 1 wt % and about 50 wt % alcohol, between about 5 wt % and 65 wt % nonionic surfactant some embodiments, the alcohol comprises isopropanol.

Further, the microemulsion may optionally contain other additives such as an additional (second) surfactant, alcohol, freezing point depression agent as well as mutual solvent. Non-limiting examples of (second) surfactants may be styrylphenol ethoxylate, a tristyrylphenol ethoxylate, a styrylphenol propoxylate, a tristyrylphenol propoxylate, a styrylphenol ethoxylate propoxylate, or a tristyrylphenol ethoxylate propoxylate. Non-limiting examples of mutual solvents may include ethyleneglycolmonobutyl ether (EGMBE), dipropylene glycol monomethyl ether, short chain alcohols (e.g., isopropanol), tetrahydrofuran, dioxane, dimethylformamide, and dimethylsulfoxide.

The microemulsion and viscoelastic fluid may be combined by conventional methods. For instance, the viscoelastic fluid may be included in a carrier and admixed with the emulsion. The foaming gas may then be added to the mixture. In general, the amount of viscoelastic surfactant in the foam is from about 0.5 to about 5 weight %, preferably from about 1 to about 2.5 weight %.

The fluid containing the viscoelastic agent to which the foaming gas is introduced, may further contain other foaming agents. Such foaming agents may be amphoteric, cationic or anionic. Suitable amphoteric foaming agents include alkyl betaines, alkyl sultaines and alkyl carboxylates.

Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Preferred as alpha-olefin sulfonates are salts of a monovalent cation such as an alkali metal ion like sodium, lithium or potassium, an ammonium ion or an alkyl-substituent or hydroxyalkyl substitute ammonium in which the alkyl substituents may contain from 1 to 3 carbon atoms in each substituent. The alpha-olefin moiety typically has from 12 to 16 carbon atoms.

Preferred alkyl ether sulfates are also salts of the monovalent cations referenced above. The alkyl ether sulfate may be an alkylpolyether sulfate and contains from 8 to 16 carbon atoms in the alkyl ether moiety. Preferred as anionic surfactants are sodium lauryl ether sulfate (2-3 moles ethylene oxide), $C_8$-$C_{10}$ ammonium ether sulfate (2-3 moles ethylene oxide) and a $C_{14}$-$C_{16}$ sodium alpha-olefin sulfonate and mixtures thereof. Especially preferred are ammonium ether sulfates.

Suitable cationic foaming agents include alkyl quaternary ammonium salts, alkyl benzyl quaternary ammonium salts and alkyl amido amine quaternary ammonium salts.

Preferred foaming agents may be alkyl ether sulfates, alkoxylated ether sulfates, phosphate esters, alkyl ether phosphates, alkoxylated alcohol phosphate esters, alkyl sulfates and alpha olefin sulfonates.

The foamed well treatment fluid described herein may be used in any of a wide variety of well treatment applications. For instance, it may be used in remediation of low pressure oil, gas, and geothermal wells. For instance, the foamed well treatment fluid may contain one or more additives used to prevent and/or inhibit the formation of unwanted deposits on the surfaces of the wellbore, downhole assembly, sand control screens, production equipment and pipelines. Such unwanted deposits form and/or accumulate in the wellbore, production equipment, recovery equipment and well casing. Such accumulated deposits affect productivity and are typically removed prior to cementing or the introduction of completion fluids into the wellbore. When used as a remediation treatment fluid, the aqueous fluid removes undesired deposits prior to the introduction of stimulation fluids or to restore well productivity from the undesired deposits. In a preferred embodiment, the aqueous fluid may be used to remove siliceous or calcareous deposits inside well tubulars. The well treatment composition may also be used to treat pipelines from undesired deposits.

The foamed well treatment fluid may act as a self-diverting fluid by selectively blocking certain pores temporarily with the viscous gel and forcing more of the aqueous fluid or other treatment fluids into a different direction. For example, the viscous gel may selectively block higher permeability zones and streaks, thereby forcing more of the aqueous fluid or other treatment fluids into lower permeability sections. may be used as a self-diverting fluid for well treatments including stimulation treatments (such as matrix acidizing, acid fracturing as well as hydraulic fracturing. For example in acidizing, the foaming fluid may form an acid gel as the acid is spent.

The acid released from the foamed well treatment fluid may further be used to remove scales in the wellbore or in the subterranean formation. In addition to removing calcium carbonate scales and siliceous deposits, the released acid may be used to remove other calcium scales as well as scales of barium, magnesium, iron and zinc including barium sulfate, magnesium fluoride, calcium sulfate, and calcium carbonate scales as well as inorganic scales, such as zinc sulfide, iron sulfide, etc In hydraulic fracturing applications, the foamed well treatment fluid may further be injected into the well before a pad fluid as a "spearhead" stage to reduce the formation breakdown pressure. A pad fluid may be then injected to initiate or create a fracture. Once the fracture is initiated, subsequent stages of fracturing fluid containing a viscosifying agent may then be pumped into the created fracture.

The foamed well treatment fluid may further be used to consolidate loose or poorly consolidated particulates in a well or formation. Hydrocarbon wells are often located in subterranean zones that contain unconsolidated particulates that can migrate out of the well along with hydrocarbon, water and other fluids produced by the well. The presence of the particulates, such as sand, in the produced fluids is problematic since it can abrade pumping and other producing equipment and reduce the fluid production capabilities of the producing zones. Unconsolidated subterranean zones can include those which contain loose particulates that are readily entrained by produced fluids and those wherein the particulates making up the zone are held together with insufficient bond strength to withstand the forces produced by the production of fluids through the zones.

The foamed well treatment fluid may be used in conjunction with consolidation treatments to prevent flowback of unconsolidated particulates from a well by consolidated particulates downhole as well as gravel packs used in sand control operations. In particular, certain resin systems used to consolidate sands and/or loose particulates are often acid activated. In accordance with the present disclosure, a curable resin may be introduced into a portion of a subterranean formation or wellbore where sands or loose particulates reside. The foaming fluid may be injected as a part of the resin consolidation treatment composition or injected separately. The released acid from the aqueous fluid may then catalyze the curing of the resin. After introducing the treatment composition into the formation or wellbore, the released acid catalyzes curing of the resin to occur at a selected time and/or target interval. The amount of curable resin may be designed to be sufficient to immobilize unconsolidated particulates within the desired treatment radial penetration around the wellbore. The amount of ammonium salt and breaker is determined to release enough acid to cure the resin volume.

The foamed well treatment fluid may further be used in conjunction with a silicate to form a silica gel plug. The silicate is soluble in water and stable at neutral pH. Typically, the silicate is sodium silicate, though other silicates such as potassium silicate as well as mixtures of sodium silicate and potassium silicate may be used. While the silicate may be a component of the aqueous fluid, the aqueous fluid may further be combined with the liquid silicate, such as on-the-fly. In an embodiment, the amount of liquid silicate may be from 5 to 60%, preferably from 5 to 30%, most preferably from 10 to 20% of the total volume of the aqueous fluid.

Upon its release, the acid hardens or enables the soluble sodium silicate to set as a plurality of silicate particles to create the amorphous silica gel, a non-crystalline ringing gel. This typically proceeds by the released acid reacting with silicate ions to form silicic acid. Under formation temperature, the silicic acids decompose into hydrated silicon dioxide gel to form the silica gel.

The silica gel plug is effectively useful in water shut-off applications. The gel plug that forms from the setting of the soluble sodium silicate causes reduction in permeability of the formation, which stops or reduces the flow of aqueous liquids through the formation. It effectively reduces the flow of unwanted water into the well and seals the formation porosity and permeability.

After the formation is sealed with the gel plug, other treatment operations, such as the aforementioned acidizing operation, may be performed, when desired.

EXAMPLES

The following examples are illustrative of some of the embodiments of the present invention. Other embodiments within the scope of the claims herein will be apparent to one skilled in the art from consideration of the description set forth herein.

Example 1

Aqueous Fluid A containing 5 weight percent ammonium chloride was prepared by mixing 10 gallons per thousand (gpt) of erucamidopropyl hydroxypropylsultaine (EPHPS) as viscoelastic surfactant and 1 gpt of a terpene containing microemulsion containing a polyether non-ionic surfactant of formula (I) as described herein. The fluid was then atomized with nitrogen gas to render a 70 foam quality fluid.

Aqueous Fluid B containing 5 weight percent ammonium chloride was prepared by mixing a multi-purpose amphoteric foamer having a 70 foam quality.

The two fluids were tested in a foam loop at 200° F. The Foam Loop was used to measure foam rheology at temperature and physical observations of the foam were recorded under a pressure of 1050 psi. The Foam Loop was designed to simulate downhole conditions. The Foam Loop measured the rheology of the foam after exposure to the bottom hole temperature for 30, 60 or 90 minutes. The foam was ranked from 1 to 10 on foam stability, based upon visual inspection wherein a score of 1 to 3 indicated the foam had extreme gas breakout and slug flow throughout the test. A score of 8 to 10 indicated the foam was homogeneous with very small bubble size and no gas breakout. Foam Quality was calculated using a Benedict-Webb-Rubin (BWR) equation of state with the LeeKesler modified parameters. The quality of the foam was calculated from the base flow rate of 2 lbm/min at the test temperature and 1050 psi.

Aqueous Fluid A was tested in the Foam Loop at 200° F. for 30 minutes. The results demonstrated a fluid with good foam properties with an average viscosity of about 109 cP @ 100 (1/s). On a scale of 1-10 the foam was rated a 7. It exhibited good body, very little gas phase separation and fairly small bubble size. The results are illustrated in FIG. 1.

A pressurized foam half-life test was conducted simultaneously with the foam rheology test. A small portion of the foam was captured in a cell and held under pressure for a period of time while being observed. The amount of liquid which accumulated in the bottom of the cell indicated the time for half of the foam to dissipate. This fluid was stable for greater than 2.5 hours. It showed no signs of water collection.

Figure 2:
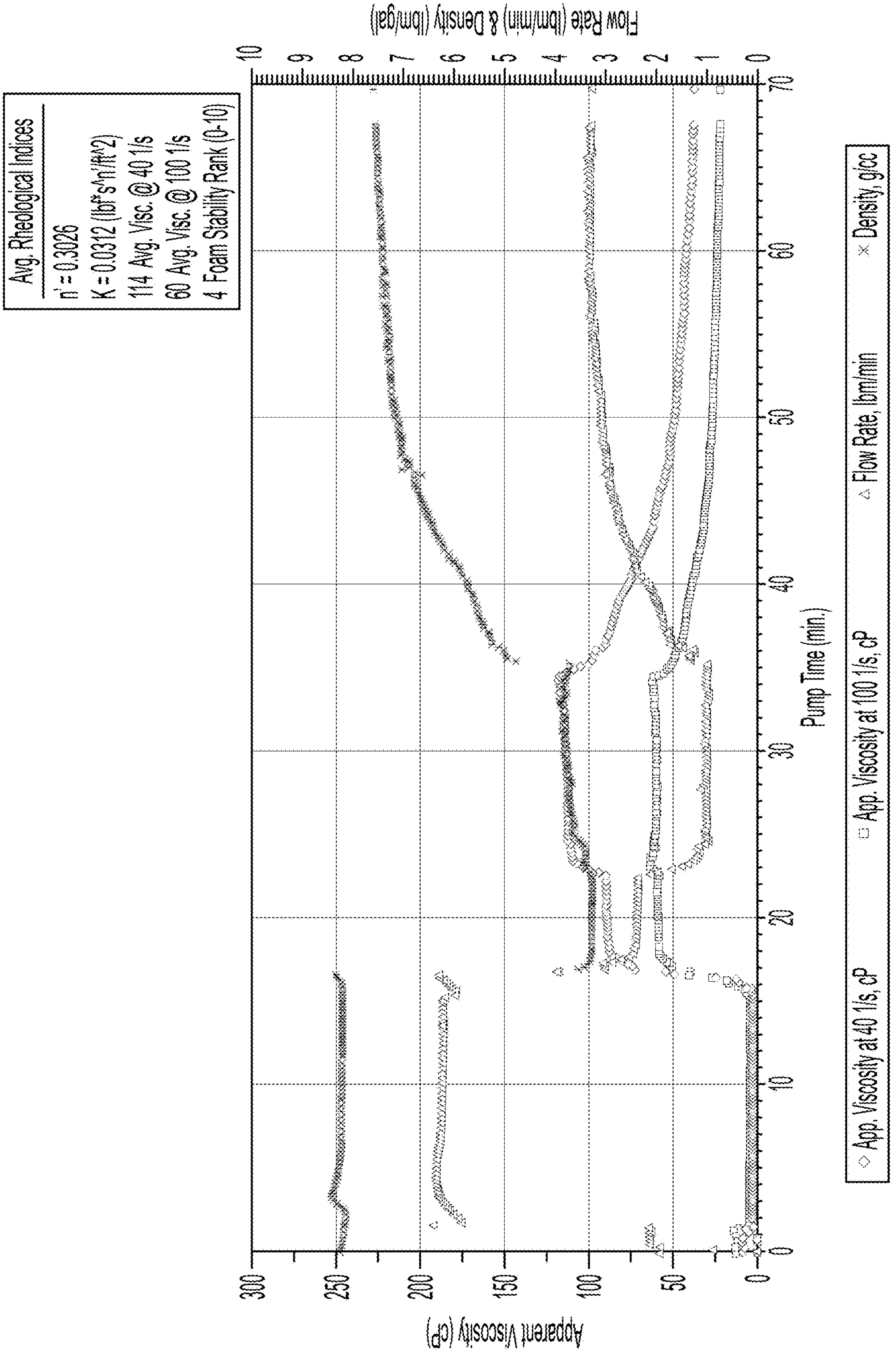
FIG. 2 illustrates the instability of a foam not containing the non-polymeric viscoelastic surfactant and microemulsion as described herein.

Nitrogen was shut off during testing of Aqueous Fluid B. Nitrogen was shut off at 23 minutes from introduction of the fluid into the loop. For the next 10 minutes, the fluid was observed to have very small bubbles with minimal breakout. At 12 minutes, larger bubbles were noted with gas break-out. Also the density began to increase indicating early gas break-out. A foam half-life test was conducted in a vertical viewing cell. The foam half-life was 22 minutes which was indicative that the foam was not stable. The overall foam was given a foam rank of a 4. The results are illustrated in FIG. 2.

Aqueous Fluid A exhibited much better foam properties than Aqueous Fluid B. Aqueous Fluid A showed has consistent bubble size throughout the foam loop test and showed no foam degradation in the pressurized foam half-life test in 2.5 hours. The average viscosity for Aqueous Fluid A was significantly higher than Aqueous Fluid B. More importantly the rheological properties were much more desirable with Aqueous Fluid A having a higher viscosity index ($K_p$). Aqueous Fluid B was much less stable and the foam continually degraded throughout the foam loop test. This can be seen in FIG. 2 where the density line gradually increased from about 35 minutes forward. This is a classic sign of an unstable foam. Further, the pressurized foam half-life test was only 22 minutes.

What is claimed is:

1. A method of enhancing foam stability in a subterranean formation penetrated by a well, the method comprising:

(A) pumping into the well:

(a) a foaming gas;

(b) a viscoelastic surfactant selected from the group consisting of:

(i) an amine or amidoamine oxide of structural formula (II):

(II)

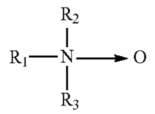

where:

$R_1$ is an alkyl, alkenyl, cycloalkyl, alkylarylalkyl, alkylamido or alkylamidoalkyl and has from about 8 to about 30 carbon atoms;

$R_2$ and $R_3$ are independently hydrogen or an aliphatic group having from 1 to about 30 carbon atoms;

(ii) an amidoamine oxide of the structural formula (III):

(III)

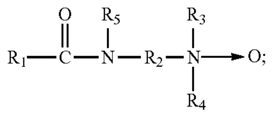

(iii) an alkylamido quaternary amine of the structural formula (IV):

(IV)

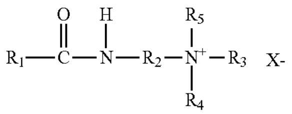

where:

$R_1$ of (III) and (IV) is independently selected from an aliphatic group of from about 8 to about 30 carbon atoms or a fatty aliphatic derived from natural fats and oil having an iodine value of from about 1 to about 140;

$R_2$ of (III) and (IV) is independently selected from a divalent alkylene group of from 2 to about 6 carbon atoms;

$R_3$ and $R_4$ of (III) and (IV) are the same or different and are independently selected from alkyl or hydroxyalkyl groups of from 1 to about 6 carbon atoms that may optionally be alkoxylated or together with the nitrogen atom form a heterocyclic ring of up to 6 members;

$R_5$ of (III) and (IV) is independently selected from hydrogen, $R_3$ or $R_4$;

X is a counterion;

and mixtures thereof; and (c) a microemulsion containing:

(iv) an aqueous phase having a surfactant of formula (I):

(I)

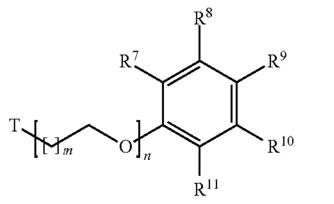

wherein each of $R^7$, $R^8$, $R^9$, $R^{10}$, and $R^{11}$ are the same or different and are selected from the group consisting of hydrogen, optionally substituted $C_1$-$C_6$ alkyl, and —CH═CHAr, wherein Ar is an aryl group, provided at least one of $R^7$, $R^8$, $R^9$, $R^{10}$ and $R^{11}$ is —CH—CHAr, T is either hydrogen, $C_{1-6}$ alkyl, $X^+Y^-$ or $Z^+$, n is 1-100, each m is independently 1 or 2, Y is an anionic group, $X^+$ is a metal cation or $N(R^{13})_4$, and Z is $N(R^{13})_3$ wherein each $R^{13}$ is independently selected from the group consisting of hydrogen, optionally substituted alkyl, or optionally substituted aryl; and (v) a non-aqueous phase comprising a terpene; and (B) forming a foam in the subterranean formation from (a), (b) and (c) wherein either (1) the viscoelastic surfactant of the foam does not thermally degrade until the temperature in the formation reaches between 325° F. to about 500° F.; or (2) the foam containing the viscoelastic surfactant and the microemulsion does not degrade until about 350° F.

2. The method of claim 1, wherein T of formula (I) is hydrogen or a $C_{1-6}$ alkyl.

3. The method of claim 1, wherein at least one of $R_2$ and $R_3$ of formula (II) is an alkyl, alkenyl, cycloalkyl, alkylaryl, hydroxyalkyl, carboxyalkyl or hydroxyalkyl-polyoxyalkylene group.

4. The method of claim 1, wherein the viscoelastic surfactant of (b) is the amidoamine oxide of structural formula (III) or an alkylamido quaternary amine of structural formula (IV).

5. The method of claim 4, wherein $R_1$ of structural formula (III) or (IV) is a fatty aliphatic derived from a natural fat or oil.

6. The method of claim 5, wherein $R_1$ is tallow alkyl, hardened tallow alkyl, rapeseed alkyl, hardened rapeseed alkyl, tall oil alkyl, hardened tall oil alkyl, coco alkyl, oleyl, or soya alkyl.

7. The method of claim 1, wherein the viscoelastic surfactant of (b) is the alkylamido quaternary amine (IV) and further wherein X is selected from the group consisting of halides, oxo ions of phosphorus, sulfur or chloride, hypochlorides, phosphates, oxides of sulfur, sulfates, sulfites, sulfonates, phosphates, acetates, carboxylates, chlorates, perchlorates, salicylates, phthalates, lactates, maleates, glycinates, citrates, citric acid, lactic acid, salicylic acid, phthalic acid, benzoic acid, naphthoic acid and amino acids.

8. The method of claim 1, wherein the viscoelastic surfactant of the foam does not thermally degrade until the temperature in the formation reaches between 375° F. to about 500° F.

9. The method of claim 1, wherein the amount of microemulsion in the formed foam is from about 0.05 to 0.4 weight percent.

10. The method of claim 1, wherein the amount of surfactant of formula (I) in the microemulsion is between about 1 wt % and about 20 wt %.

11. The method of claim 1, wherein the terpene is d-limonene.

12. The method of claim 1, wherein the microemulsion further comprises an alcohol.

13. The method of claim 12, wherein the alcohol contains from 1 to about 20 carbon atoms.

14. The method of claim 1, wherein:

(a) the viscoelastic surfactant is of structural formula (II);

(b) the microemulsion contains from about 5 to about 65 weight percent of the surfactant of formula (I):

(I)

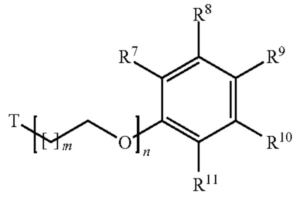

wherein each of $R^7$, $R^8$, $R^9$, $R^{10}$, and $R^{11}$ are the same or different and are selected from the group consisting of hydrogen, optionally substituted $C_1$-$C_6$ alkyl and —CH═CHAr, wherein Ar is an aryl group including phenyl, provided at least one of $R^7$, $R^8$, $R^9$, $R^{10}$, and $R^{11}$ is —CH═CHAr, T is hydrogen or a $C_{1-6}$ alkyl n is 1-100, and each m is independently 1 or 2;

(c) the microemulsion further contains between from about 1 to about 50 weight percent of an alcohol;

(d) the microemulsion contains from about 1 to about 30 weight percent of the terpene; and (e) the microemulsion contains between from about 1 to about 60 weight percent of water.

15. The method of claim 1, further comprising:

(a) enhancing the thermal stability of the foam with the microemulsion;

(b) thermally degrading the viscoelastic surfactant at a temperature from 325° F. to 500° F.;

(c) selectively blocking a permeable first zone in the well with the foam and then diverting flow of fluid into a second zone wherein the permeability of the second zone is lower than the permeability of the first zone;

(d) releasing acid from the foam and removing scales in the subterranean formation with the released acid;

(e) reducing breakdown formation pressure with the foam and then pumping a pad fluid into the formation and initiating or creating a fracture within the subterranean formation;

(f) consolidating particles in the well or subterranean formation with the foam; or (g) forming a silica gel plug with a silicate and the foam.

16. A method of enhancing foam stability in a subterranean formation penetrated by a well, wherein pressure in the well is from about 1 to about 100 psi, the method comprising:

(A) pumping into the well a gas and a fluid comprising: a viscoelastic surfactant of an alkylamido quaternary amine of the structural formula (IV):

(IV)

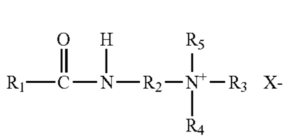

where:

$R_1$ is an aliphatic group of from about 8 to about 30 carbon atoms or a fatty aliphatic derived from natural fats and oil having an iodine value of from about 1 to about 140;

$R_2$ is a divalent alkylene group of from 2 to about 6 carbon atoms;

$R_3$ and $R_4$ are the same or different and are selected from alkyl or hydroxyalkyl groups of from 1 to about 6 carbon atoms that may optionally be alkoxylated or together with the nitrogen atom form a heterocyclic ring of up to 6 members;

$R_5$ is hydrogen, $R_3$ or $R_4$;

X is a counterion; and a microemulsion containing:

(i) an aqueous phase having a surfactant of formula (I):

(I)

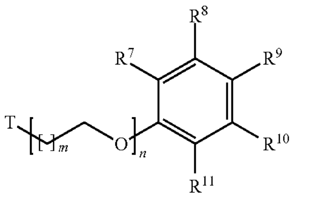

wherein each of $R^7$, $R^8$, $R^9$, $R^{10}$, and $R^{11}$ are the same or different and are selected from the group consisting of hydrogen, optionally substituted $C_1$-$C_6$ alkyl, and —CH═CHAr, wherein Ar is an aryl group including phenyl, provided at least one of $R^7$, $R^8$, $R^9$, $R^{10}$, and $R^{11}$ is —CH—CHAr, T is hydrogen or a $C_1$-6 alkyl n is 1-100, each m is independently 1 or 2;

(ii) an alcohol; and (iii) a non-aqueous phase comprising a terpene; and (B) forming a foam from the pumped fluid and gas in the subterranean formation wherein either (1) the viscoelastic surfactant of the foam does not thermally degrade until the temperature in the formation reaches between 325° F. to about 500° F.; or (2) the foam containing both the viscoelastic surfactant and the microemulsion does not degrade until about 350° F.

17. The method of claim 16, wherein the terpene is limonene.

18. The method of claim 16, wherein the microemulsion further comprises a solvent selected from hydrocarbons, and amines.

19. The method of claim 16, wherein the amount of water in the aqueous phase of the microemulsion is between from about 5 to about 60 weight percent and/or the amount of microemulsion in the formed fluid foam is between from about 0.05 to about 4 weight percent.

20. A method of enhancing foam stability in a subterranean formation penetrated by a well, the method comprising:

(A) pumping into the well:

(a) a foaming gas;

(b) a viscoelastic surfactant selected from the group consisting of:

(i) an amine or amidoamine oxide of structural formula (II):

(II)

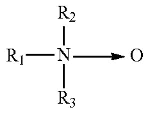

where:

$R_1$ is an alkyl, alkenyl, cycloalkyl, alkylarylalkyl, alkylamido or alkylamidoalkyl and has from about 8 to about 30 carbon atoms;

$R_2$ and $R_3$ are independently hydrogen or an aliphatic group having from 1 to about 30 carbon atoms;

(ii) an amidoamine oxide of the structural formula (III):

(III)

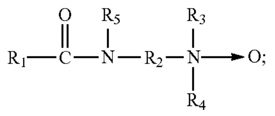

(iii) an alkylamido quaternary amine of the structural formula (IV):

(IV)

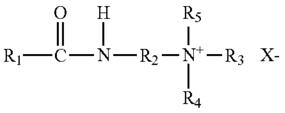

and mixtures thereof;

where:

$R_1$ of (III) and (IV) is independently selected from an aliphatic group of from about 8 to about 30 carbon atoms or a fatty aliphatic derived from natural fats and oil having an iodine value of from about 1 to about 140;

$R_2$ of (III) and (IV) is independently selected from a divalent alkylene group of from 2 to about 6 carbon atoms;

$R_3$ and $R_4$ of (III) and (IV) are the same or different and are independently selected from alkyl or hydroxyalkyl groups of from 1 to about 6 carbon atoms that may optionally be alkoxylated or together with the nitrogen atom form a heterocyclic ring of up to 6 members;

$R_5$ of (III) and (IV) is independently selected from hydrogen, $R_3$ or $R_4$;

X is a counterion;

and (c) a microemulsion containing:

(iv) an aqueous phase having a surfactant of formula (I):

(I)

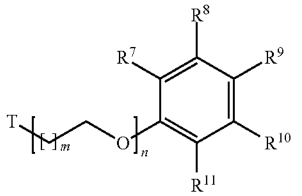

wherein each of $R^7$, $R^8$, $R^9$, $R^{10}$, and $R^{11}$ are the same or different and are selected from the group consisting of hydrogen, optionally substituted $C_1$-$C_6$ alkyl, and —CH—CHAr, wherein Ar is an aryl group, provided at least one of $R^7$, $R^8$, $R^9$, $R^{10}$, and $R^{11}$ is —CH—CHAr, T is either hydrogen, $C_{1-6}$ alkyl, $X^+Y^-$ or $Z^+$, n is 1-100, each m is independently 1 or 2, Y is an anionic group, $X^+$ is a metal cation or $N(R^{13})_4$, and Z is $N(R^{13})_3$, wherein each $R^{13}$ is independently selected from the group consisting of hydrogen, optionally substituted alkyl, or optionally substituted aryl; and (v) a non-aqueous phase comprising a terpene;

(B) forming a foam from (a), (b) and (c) in the subterranean formation wherein either (1) the viscoelastic surfactant of the foam does not thermally degrade until the temperature in the formation reaches between 325° F. to about 500° F.; or (2) the foam containing both the viscoelastic surfactant and the microemulsion does not degrade until about 350° F.; and (C) either (a) selectively blocking a permeable first zone in the well with the foam and then diverting flow of fluid into a second zone wherein the permeability of the second zone is lower than the permeability of the first zone; (b) releasing acid from the foam and removing scales in the subterranean formation with the released acid; (c) reducing breakdown formation pressure with the foam and then pumping a pad fluid into the formation and initiating or creating a fracture within the subterranean formation; (d) consolidating particles in the well or subterranean formation with the foam; or (e) forming a silica gel plug with a silicate and the foam.

* * * * *